United States Patent Office 3,327,546
Patented June 27, 1967

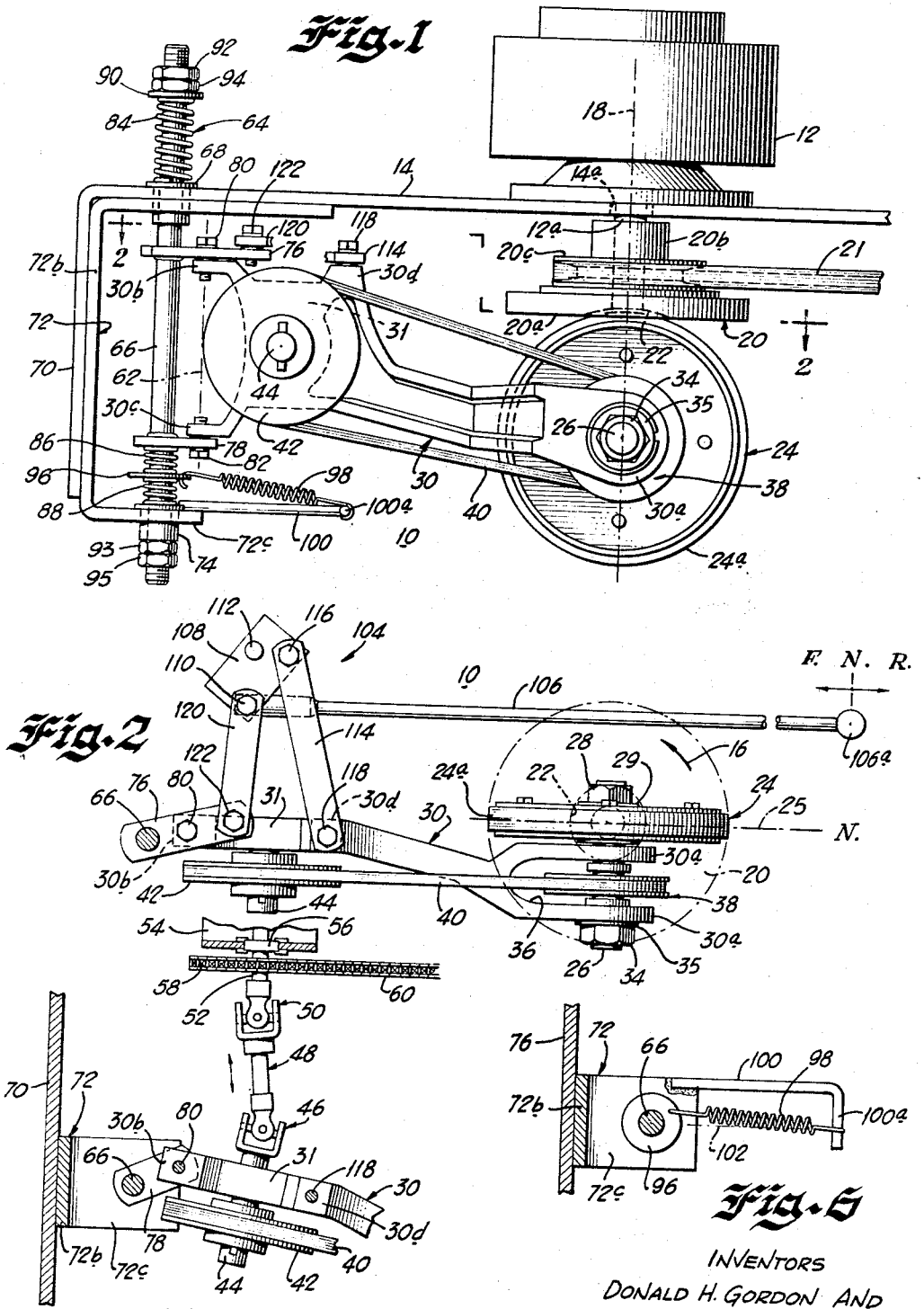

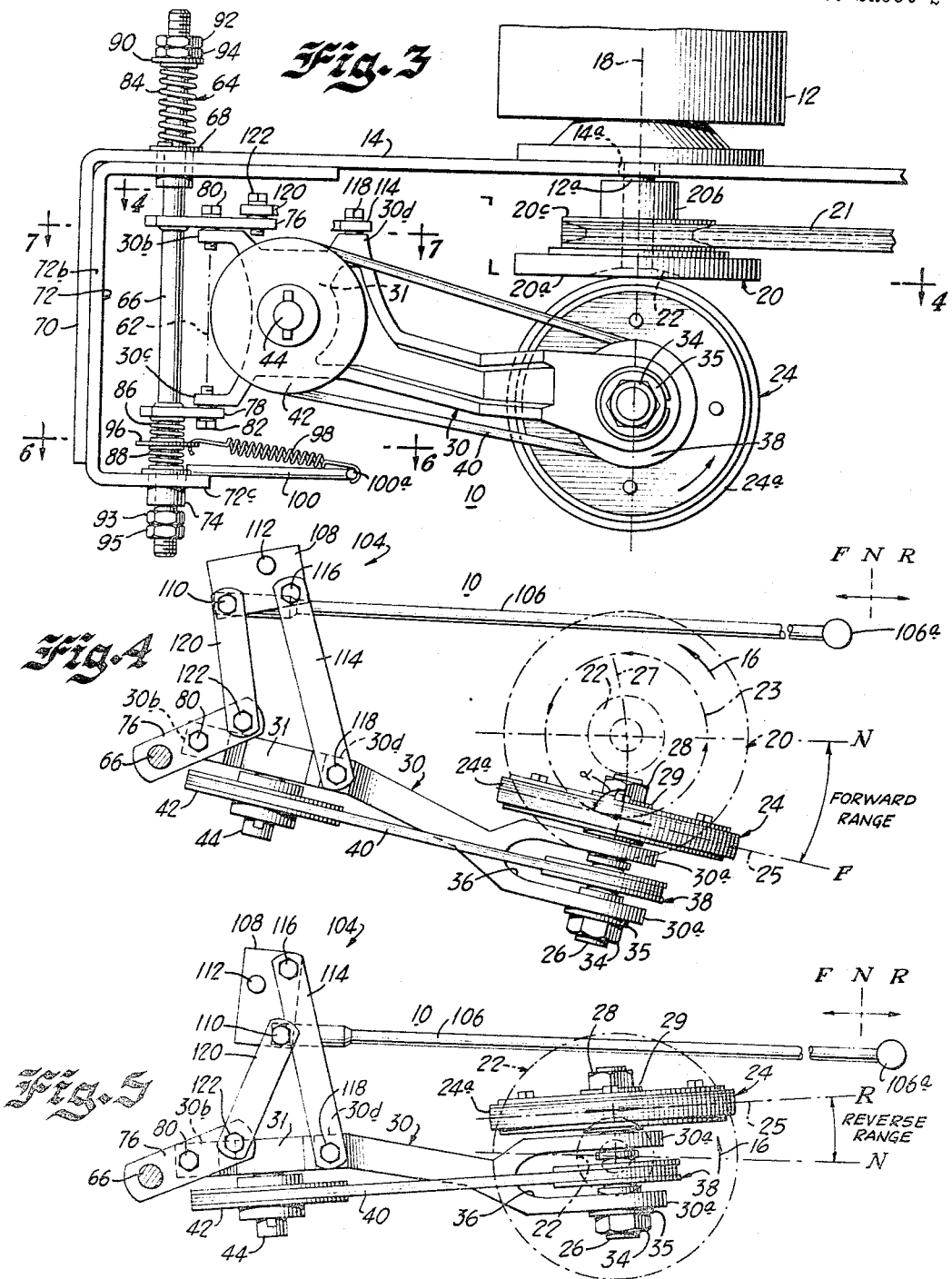

3,327,546
TRANSMISSION SYSTEM
Donald H. Gordon and Eugene A. Pannell, Waynesboro, Va., assignors to Virginia Metalcrafters, Incorporated, Waynesboro, Va., a corporation of Virginia
Filed Sept. 24, 1965, Ser. No. 489,981
13 Claims. (Cl. 74—194)

The present invention relates to transmission systems and, more particularly, to transmission systems capable of delivering power in both forward and reverse directions at different torques and speeds.

The transmission system of the present invention is ideally suited for use with riding lawn mowers, garden tractors, small power-driven wheeled vehicles, and the like, although it may be useful in various other types of fixed installations. One of the problems encountered in small wheeled vehicles of the type described is that of providing a simple, trouble-free, relatively low-in-cost transmission system which is capable of driving the wheels of the vehicle in both forward and reverse directions and at a variety of speeds and torques.

Therefore, it is an object of the present invention to provide a transmission system for delivering power in both forward and reverse directions throughout a wide range of different torques and speeds.

More specifically, it is an object of the present invention to provide a transmission system of the type described which is simple in construction and operation and low in cost.

Another object of the present invention is the provision of a new and improved transmission system including both a forward and reverse range and a neutral therebetween.

Another object of the present invention is the provision of a new and improved transmission system of the type described which eliminates the need for a separate clutch mechanism.

Still another object of the present invention is a new and improved transmission system having a single control lever for operating from a neutral position to either forward or reverse drive in a range of speeds and torques.

Another object of the present invention is the provision of a new and improved transmission system using a friction drive and including means for reducing wear on the driving members to a minimum.

Still another object of the present invention is the provision of a new and improved transmission system of the type described, including means for easily maintaining the proper frictional engagement between driving members therein to eliminate excessive wear.

The foregoing and other objects and advantages of the present invention are accomplished by the provisions of a new and improved transmission system comprising a rotary drive member having a frictional driving surface and rotatable in one direction about a drive axis. A swing arm having one end mounted for pivotal movement about a second axis remote from and parallel to the drive axis includes an opposite or free end which supports a rotatable driven member movable along a path extending in opposite directions from the drive axis, whereby the driven member may be aligned in a neutral position on the drive axis and is movable therefrom in opposite directions into forward and reverse driving engagement with the frictional driving surface of the rotating drive member. Control means is provided to control the pivotal movement of the swing arm about the second axis and to move the second axis toward and away from the drive axis whereby the driven member is in tangential contact with a concentric path on the frictional surface of the drive member. By maintaining tangential contact throughout a range of drive ratios, wear on the engaging drive member and driven member is reduced appreciably.

For a better understanding of the present invention, reference should be had to the following detailed description taken in conjunction with the drawings, in which:

FIG. 1 is a side elevational view of a transmission system constructed in accordance with the present invention and shown in one of its operative positions;

FIG. 2 is a sectional view of the transmission system of FIG. 1 taken substantially along line 2—2 of FIG. 1 with portions of the structure omitted for clarity;

FIG. 3 is a side elevational view of a transmission system similar to FIG. 1 but illustrating the system in another of its operative positions;

FIG. 4 is a sectional view taken substantially along line 4—4 of FIG. 3;

FIG. 5 is a sectional view similar to FIG. 4 but illustrating the transmission system in yet another operative position;

FIG. 6 is a sectional view taken substantially along line 6—6 of FIG. 3 with portions of the structure omitted for clarity; and FIG. 7 is a sectional view taken substantially along line 7—7 of FIG. 3 again with portions of the structure omitted for clarity.

Referring now more specifically to the drawings, there is illustrated a new and improved transmission system 10 constructed in accordance with the present invention and adapted to transmit power from an engine or prime mover 12 of a vehicle to the ground engaging drive wheels (not shown) thereof. The engine 12 is mounted on a horizontal section 14 of the vehicle framework and includes an output shaft 12a extending downwardly through an opening 14a in the section 14. The engine shaft 12a rotates in a counterclockwise direction (as indicated by the arrows 16 in FIGS. 2, 4, and 5) about a vertical drive axis 18, and a drive member 20 is mounted on the lower end of the shaft beneath the horizontal section 14 of the vehicle framework.

The drive member 20 is in continuous rotation whenever the engine shaft 12a is turning, and includes a lower, horizontally extending, planar, frictional driving surface 20a. The drive member includes an upper hub portion 20b which may be splined or keyed to the shaft 12a and one or more integrally formed sheaves 20c or sprockets for supplying power via a belt 21 or chain to drive other components of the vehicle, such as a mower blade or snow blowing attachment. The drive member 20 is formed with a central recess 22 extending upwardly from the frictional driving surface 20a and, accordingly, the driving surface comprises an annular ring concentric with the drive axis 18.

The driving surface 20a is adapted to drivingly engage the outer peripheral surface of a rotating driven member or wheel 24 which is mounted on a horizontally disposed axle 26 adjacent the outer end of a movable swing arm assembly 30. The driven wheel 24 includes a replaceable, traction disk or outer peripheral traction tire 24a formed of material such as rubber and the like, and is keyed or splined to rotate with the axle 26. An outer nut 28 and washer 29 secure the wheel against longitudinal movement on the axle 26 which projects through a pair of aligned apertures defined in spaced-apart end projections 30a which form the outer end of the swing arm assembly 30. Suitable bearings (not shown) are mounted in the apertures to support the shaft for free rotation on the swing arm, and an outer nut 34 and washer 35 are provided to secure the axle against axial displacement on the swing arm.

The inner surfaces of spaced-apart, end projections 30a form a slot or recess 36 in the outer end of the swing arm 30 and an adjustable pulley or sheave 38 is mounted on the axle 26 within this recess. The sheave 38 is keyed or splined to rotate with the axle and the driven wheel 24, and the pitch diameter thereof can be changed to adjust speed range of the transmission system. Power from the sheave 38 is transmitted through an endless belt 40 to a sheave 42 mounted on a base section 31 of the swing arm assembly 30 opposite the free end thereof. The sheave 42 is mounted on a shaft 44 which extends through the base section 31 and suitable bearings (not shown) are provided to support the shaft for rotation thereon.

Power is delivered to the drive wheels of the vehicle (not shown) from the shaft 44 through a first universal joint 46, a telescoping shaft assembly 48 of adjustable length, a second universal joint 50 and a jackshaft 52. The jackshaft 52 is mounted for rotation on a pair of bearings 56 (only one shown) carried on a bracket 54 which is secured to the framework of the vehicle. A sheave or sprocket 58 on the jackshaft 52 is provided to drive the vehicle wheels directly, or indirectly, through a differential mechanism by means of a belt or chain 60. Because the swing arm 30 is pivotally movable, the shaft 44 carried thereby changes in angular relation and spacing with respect to the jackshaft 52 and, accordingly, the universal joints 46 and 50 and telescoping shaft section 48 provide a convenient means of interconnecting the shaft 44 and jackshaft 52. The power delivered to the driven wheel 24 from the rotating drive member 20 is continuously delivered to jackshaft 52, sprocket 58, and chain 60 even though the swing arm 30 moves between several positions (FIGS. 4 and 5) relative to the drive member 20.

The swing arm assembly 30 is supported by means of an arm supporting assembly 64 for pivotal movement about a vertical axis 62 parallel to the drive axis 18. The supporting assembly 64 includes a vertically extending support rod 66 which extends upwardly through an upper, flanged bushing 68 mounted in the horizontal section 14 of the vehicle framework. The vehicle framework also includes a vertically extending rear end panel 70 integrally joined with the horizontal section 14 and a C-shaped support bracket 72 having an upper horizontal leg 72a secured to the underside of the horizontal section 14, a vertical central portion 72b secured to the inside face of the rear panel 70, and a lower horizontal leg 72a extending toward the drive axis 18 from the rear panel. A lower, flanged bushing 74 is mounted in the lower leg 72c of the support bracket to journal the lower end portion of the support rod 66 which extends downwardly below the leg 72c. The upper and lower bushings 68 and 74 are in vertical alignment with each other and parallel to the axis 62 so that the support rod 66 may rotate and move axially within the bushings.

In order to support the base section 31 of the swing arm assembly, which is adjacent the rod 66, the arm support assembly 64 includes an upper, horizontally extending support arm or lug 76 and a spaced, lower, horizontally extending support arm or lug 78. The supports 76 and 78 are secured to the rod 66 as by welding and are aligned with each other vertically, with the axis 62 extending therethrough. The base section 31 of the swing arm assembly is formed with upper and lower, protruding, support lugs 30b and 30c, and these lugs are pivotally secured between the arms 76 and 78 by pivot bolts 80 and 82 which are in axial alignment with the axis 62. As the arm support assembly 64 pivots about the vertical axis of the support rod 66, the support axis 62 of the swing arm assembly 30 moves toward and away from the drive axis 18.

The arm support assembly 64 and, consequently, the swing arm assembly 30 and driven wheel 24 are biased upwardly by an upper coil spring 84 and a pair of lower coil springs 86 and 88. The springs are coaxially mounted on the support rod 66, and the upper spring 84 is compressed between the upper surface of the upper bushing 68 and an upper bearing washer 90. The washer 90 is held in place on the support rod 66 against the force of the spring 84 by a pair of adjustable stop nuts 92 and 94 which are threaded onto the upper portion of the support rod and are movable thereon to adjust the compression or upward biasing force exerted by the spring 84 on the arm support assembly 64.

In order to limit the upward movement of the support rod 66 in the bushings 68 and 74, and thereby limit the upward travel of the driven wheel 24, a pair of stop nuts 93 and 95 are threaded onto the lower end of the support rod below the lower bushing 74. When the driven wheel 24 is in a neutral position (FIG. 2) with a central vertical plane of the wheel (represented by a line 25 in FIGS. 2, 4, and 5) intersecting the drive axis 18, the uppermost portion of the traction disk 24a protrudes upwardly above the driving surface 20a of the drive member into central recess 22. The stop nuts 93 and 95 are adjusted on the rod 66 so that a slight amount of clearance (FIG. 1) is provided between the traction tire and recess when the swing arm 30 and driven wheel 24 are in the neutral position. Once the swing arm and driven wheel are moved to either side of the neutral position (FIGS. 4 and 5), the traction disk 24a moves out of the recess 22 on the drive member 20 and drivingly engages the annular friction drive surface 20a. When in driving engagement, as described, the swing arm 30 and arm support assembly 64 are positioned downwardly from the neutral position as shown in FIG. 3, and the stop nut 93 is spaced below the lower surface of the bushing 74, permitting the springs 84, 86, and 88 to exert unrestricted upward biasing forces on the swing arm and maintain the desired force between the traction disk 24a and the frictional drive surface 20a. The nuts 92 and 94 can be adjusted as desired to obtain the desired frictional force and, as wear occurs on the traction disk or frictional driving surface, adjustments can be made to compensate.

The lower springs 86 and 88 are interposed between the lower support arm 78 and the upper surface of the lower bushing 74, and also exert an upward biasing force on the swing arm 30. A bearing washer 96 is interposed between the two lower springs and is tightly compressed therebetween to float upwardly or downwardly with the vertical movements of the support rod 66. The washer 96 tends to rotate with the support rod 66 and, in order to resist torsional moments applied on the rod by the swing arm assembly 30, a tension spring 98 is interconnected between the floating washer 96 and a fixed L-shaped rod member 100 secured to the lower leg 72c of the support bracket 72. The rod member 100 includes a short transversely extending end portion 100a having a notch therein and the outer end of the spring 98 is looped around the end portion and seated in the notch. The inner end of the spring is hooked through the hole in the floating washer 96.

Referring to FIG. 6, if a counterclockwise moment is applied to the support rod 66, the floating washer 96 tends to rotate in the same direction with the rod. This rotation is opposed by the spring 98 which resists elongation and exerts a counteracting force on the washer in an opposite direction, tending to rotate the rod in a clockwise direction. The washer 96 is not positively attached to the rod 66 but is held between the springs 86 and 88 and, accordingly, may slip if the torque becomes too great. The spring 98 and washer 96 do, however, exert a force on the support rod 66 through the springs 86 and 88, and this force is in opposition to torsional forces applied tending to rotate the rod away from a neutral angular position represented by the line 102 (FIG. 6) wherein the spring 98 is at a minimum length.

In order to pivot the swing arm assembly 30 about its mounting axis 62 to move the driven wheel 24 carried thereby to either side of the drive axis 18 (FIGS. 4 and 5) and into driving engagement with the driving surface 20a, a control assembly 104 is interconnected between the swing arm support assembly 64 and the swing arm 30.

The control assembly 104 includes a forwardly extending control rod 106 having a forward end 106a adapted for movement between a forward, a neutral, and a reverse position (FIGS. 2, 4, and 5). The rearward end of the control rod 106 is pivotally connected to a rocker member 108 by a pin 110. The rocker member 108 is mounted for pivotal movement about a vertical mounting pin 112 secured in fixed position on the vehicle framework. Longitudinal movement of the control arm 106 from the neutral position (FIG. 2) to a forward drive position (FIG. 4) causes the rocker member 108 to rotate in a clockwise direction while movement of the control rod in a reverse drive position (FIG. 5) causes the rocker member to rotate in a counterclockwise direction.

The rocker member 108 is linked or interconnected with both the arm support assembly 64 and the swing arm 30 itself. Interconnection between the rocker member and swing arm 30 is provided by a linking member 114 having one end connected to the rocker member by means of a pivot pin 116 and the other end connected to an upstanding projection 30d formed on the swing arm by means of a pivot pin 118. Interconnection between the rocker member and arm support assembly 64 is provided by a linking member 120 somewhat shorter than the member 114. One end of the linking member 120 is connected to the rocker member by the pivot pin 110, and the other end is connected to the upper support arm 76 of the arm support assembly 64 by a pivot pin 122 at a point outwardly of the pivot pin 80 which interconnects the support arm 76 and the swing arm 30.

When the control rod 106 is in the neutral position (FIG. 2), the central plane 25 of the driven member 24 intersects the vertical drive axis 18. In this position, the traction 24a extends upwardly above the frictional drive surface 20a but is not in driving engagement with the drive member 20 because of the central recess 22 provided therein. The upward movement of the drive wheel 24 is limited by the stop nuts 93 and 94 which limit the upward travel of the support rod 66. The drive member 20 is continuously rotating whenever the engine 12 is in operation, but when the swing arm 30 and driven wheel 24 are positioned in the neutral position, no driving contact is effected between the drive member and driven wheel. Accordingly, a separate clutch mechanism is not required with the transmission system 10 of the present invention because movement of the swing arm 30 into the neutral position automatically disengages the driven wheel 24 and the drive member.

Referring to FIG. 4, as the control rod 106 is moved rearwardly from the neutral position into the forward driving range, the swing arm 30 moves in a clockwise direction and the traction disk 24a moves out of the central recess 22 of the drive member 20 into frictional driving contact with the annular driving surface 20a thereon. The driven wheel 24 is driven in a counterclockwise direction (FIG. 3) by the frictional engagement between the driving surface 20a and the traction disk 24a. The linkage mechanism 104 is designed to control the movement of the free end of the swing arm 30 relative to drive axis 18 in a manner whereby the central vertical plane 25 of the driven wheel 24 is always tangent to a circular path of contact (represented by the circle 23 on the annular frictional drive surface 20a) between the traction disk and drive member. The driven wheel 24 moves along a curvilinear path 27 (FIG. 4) which extends in opposite directions from the neutral position on the drive axis 18. During movement of the driven wheel in the forward drive direction, the circular path of contact 23 expands outwardly toward the periphery of the drive member and the center plane 25 of the wheel is maintained to lie tangent therewith, as represented by the right angle α (FIG. 4). In any position along the path 27 in a forward driving direction, the swing arm 30 is in a stable condition because of the tangency between the circular path 23 and the central plane 25 of the driven wheel 24. Should the arm 30 move too far outwardly for an instant, a restoring force is automatically set up tending to return the arm to a stable condition wherein the center plane 25 of the driven wheel and circular path of contact 23 are again tangent. Should the arm move inwardly momentarily, a restoring force is automatically set up to return the arm to a stable position. As the driven wheel 24 is moved farther outwardly toward the perimeter of the driving surface 20a, the speed of the driven wheel is increased and the torque reduced. By controlling the position of the driven wheel relative to the drive axis 18, the desired speed and torque can be selected, and, once selected, will be maintained.

It should be noted that movement of the control rod 106 from a neutral into a forward drive position causes a clockwise rotation of the rocker member 108. Clockwise movement of the rocker member 108 causes the support arm 76 of the arm support assembly 64 to move in a counterclockwise direction and, accordingly the pivot axis 62 of the swing arm 30 moves away from the drive axis 18. The movement of the pivot axis 62 away from the drive axis 18 permits the path 27 of the driven wheel 24 to be patterned so as to provide for continuous tangency with the circular contact path 23 and the center plane 25 of the driven wheel throughout the entire forward driving range. If the pivot axis 62 were fixed rather than movable, the driven wheel 24 would move along a circular arcuate path and could only be truly tangent with the circular contact path 23 at one radius or position on the drive surface 20a. In turn, this one point or position would be the only stable drive condition in the forward range and the swing arm would be unstable and would tend to move inward or outward relative to the drive axis 18 if not at the stable condition. Consequently, continuous force would have to be applied to maintain the swing arm in other than the one stable condition and excessive wear on the driving surface and traction tire would result. The control system 104 and movable pivot axis 62 of the present invention provide for a minimum of frictional loss and wear and insure a stable drive throughout a wide range of speed and torque conditions.

Because the present invention provides for stable drive in a forward direction throughout a wide range of speeds and torques, the control rod 106 can be set for the desired driving condition and this condition will be maintained with little, if any, oscillating movements of the swing arm 30 or hunting thereof. The amount of movement of the control rod 106 automatically controls the speed selected and, accordingly, a maximum movement of the control rod provides for maximum speed and moves the swing arm 30 to position the drive wheel 24 adjacent the outer periphery of the annular frictional drive surface 20a.

Movement of the control rod 106 from a neutral position (FIG. 2) into a reverse drive direction (FIG. 5) causes the swing arm 30 to pivot in a counterclockwise direction. Accordingly, the driven wheel 24 is driven to rotate in a clockwise or reverse direction as it moves into driving engagement with the driving surface 20a. Because of the arrangement of the members making up the control assembly 104, movement of the control rod 106 in a forward drive direction by a given amount causes a greater movement of the driven wheel 24 from the drive axis 18 than the movement of the driven wheel away from the drive axis in response to an equal amount of movement of the control rod in a reverse drive direction. This is a desirable feature because close forward speed control is desirable, whereas it is desirable to limit the reverse speed to values well below those of a forward direction because of difficulty in steering while in a reverse direction.

The transmission system 10 provides many advantages over prior friction wheel type transmission devices. The friction pressure between the drive wheel 20 and drive wheel 24 is easily adjusted by the stop nuts 92 and 94 and the neutral clearance is likewise easily adjusted by the stop nuts 93 and 95. The control assembly 104 and swing arm support assembly 64 cooperate to provide a convenient means for selecting and controlling the desired direction and driving speeds. Moreover, provision is made for insuring stable drive conditions within the entire forward speed range and minimum wear on the frictionally engaging members is insured.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A transmission system, in combination, comprising a rotary drive member having a frictional driving surface and rotatable in one direction about a first axis, a swing arm having one end mounted for pivotal movement on a second axis remote from said first axis, a driven member mounted for rotation on an opposite end of said swing arm and movable therewith along a curvilinear path between a forward drive position on one side of said first axis, a neutral position aligned with said first axis and a reverse drive position on an opposite side of said first axis, said driven member including a peripheral edge for driving engagement with said frictional driving surface, and means for biasing said swing arm to move said driven member into driving engagement with said frictional driving surface of said drive member.

2. The transmission system of claim 1 including means for biasing said swing arm around said second axis to move said driven member into said neutral position.

3. The transmission system of claim 1 including control means movable in opposite directions from a neutral position and interconnected with said swing arm to move said driven member along said curvilinear path into forward and reverse driving engagement with said frictional driving surface of the drive member.

4. The transmission system of claim 3 including linkage means interconnected between said control means and said swing arm, said linkage means including means for moving said driven member a greater distance along said curvilinear path toward said one side of said first axis in response to a selected amount of movement of said control means in one direction from a neutral position, than for moving said driven member along said curvilinear path toward the other side of said first axis in response to an equal selected amount of movement of said control means in an opposite direction from a neutral position.

5. The transmission system of claim 4 wherein said control means includes means for moving said swing arm longitudinally as said driven member is moved along said curvilinear path.

6. A transmission system, in combination, comprising a rotary drive member having a frictional driving surface and rotatable in one direction about a first axis, a swing arm having one end mounted for pivotal movement on a second movable axis remote from said first axis, a driven member mounted for rotation on an opposite end of said swing arm and movable therewith along an arcuate path between a forward drive position on one side of said first axis, a neutral position aligned with said first axis and a reverse drive position on an opposite side of said first axis, said driven member including a peripheral edge for driving engagement with said frictional driving surface, a swing arm support member mounted for pivotal movement on a fixed third axis parallel to and a fixed distance from said first axis, said support member pivotally supporting said one end of said swing arm for pivotal movement in relation thereto about said second axis toward and away from said first axis and biasing means engaging said support member for biasing said driven member toward said frictional driving surface.

7. The transmission system of claim 6 including means for biasing said support member towards a neutral angular position about said third axis wherein said swing arm is disposed to position said driven member in said neutral position on said first arm.

8. The transmission system of claim 7 including control means movable in opposite directions from a neutral position and operatively connected with said swing arm to move said driven member carried thereon along said arcuate path between said neutral, forward, and reverse positions.

9. The transmission system of claim 8 wherein said control means includes a reciprocating control rod having one end connected to a pivotally mounted rocker, a pair of linking members of different lengths, each member having one end connected to said rocker at spaced-apart points thereon, one of said linking members having an opposite end connected to said swing arm and the other linking member having an opposite end connected to said support member outwardly of said third axis.

10. A transmission system, in combination, comprising a drive member having a circular driving surface rotatable in a horizontal plane in one direction about a first, vertical axis, a driven member mounted for rotation about a horizontal axis and including a peripheral surface adapted to engage the driving surface of said drive member, a movable swing arm having means adjacent a free end thereof for supporting said driven member, said swing arm including an opposite end mounted for pivotal movement about a second vertical axis spaced from and movable toward and away from said first axis, and means for moving the free end of said swing arm to carry said driven member along a curvilinear path between positions on one side of said first axis to positions on the other side thereof.

11. The transmission system of claim 10 wherein said last-mentioned means includes shifting means to maintain said driven member in tangential contacting engagement with concentric, circular paths on said driving surface when positioned on one side of said first axis.

12. The transmission system of claim 11 including spring means biasing said driven member toward driving surface.

13. The transmission system of claim 12 wherein said drive member is formed with a central recess in said driving surface and including stop means engaging said swing arm to maintain spacing between the peripheral surface of said driven member and said drive member when said driven member is positioned in a neutral position aligned on said first axis.

References Cited
UNITED STATES PATENTS

| | | | |
|---|---|---|---|
| 862,652 | 8/1907 | Parce | 74—207 |
| 974,308 | 11/1910 | Swift | 74—194 |
| 1,248,524 | 12/1917 | Mills | 74—194 |

FRED C. MATTERN, Jr., *Primary Examiner.*

C. J. HUSAR, *Assistant Examiner.*